United States Patent
Inoue

(10) Patent No.: US 12,110,395 B2
(45) Date of Patent: Oct. 8, 2024

(54) RUBBER COMPOSITION, CROSSLINKED BODY, AND TIRE

(71) Applicant: ENEOS MATERIALS CORPORATION, Tokyo (JP)

(72) Inventor: Masaaki Inoue, Tokyo (JP)

(73) Assignee: ENEOS MATERIALS CORPORATION, Tokyo (JP)

(*) Notice: Subject to any disclaimer, the term of this patent is extended or adjusted under 35 U.S.C. 154(b) by 614 days.

(21) Appl. No.: 17/423,639

(22) PCT Filed: Jan. 27, 2020

(86) PCT No.: PCT/JP2020/002814
§ 371 (c)(1),
(2) Date: Jul. 16, 2021

(87) PCT Pub. No.: WO2020/158678
PCT Pub. Date: Aug. 6, 2020

(65) Prior Publication Data
US 2022/0064414 A1    Mar. 3, 2022

(30) Foreign Application Priority Data
Jan. 30, 2019  (JP) .................... 2019-014823

(51) Int. Cl.
| | |
|---|---|
| C08L 9/06 | (2006.01) |
| B60C 1/00 | (2006.01) |
| C08K 3/06 | (2006.01) |
| C08L 7/00 | (2006.01) |
| C08L 15/00 | (2006.01) |
| C08L 23/06 | (2006.01) |
| C08L 53/02 | (2006.01) |

(52) U.S. Cl.
CPC .............. *C08L 9/06* (2013.01); *B60C 1/0016* (2013.01); *B60C 1/0025* (2013.01); *C08K 3/06* (2013.01); *C08L 7/00* (2013.01); *C08L 15/00* (2013.01); *C08L 23/06* (2013.01); *C08L 53/025* (2013.01); *C08L 2205/03* (2013.01); *C08L 2207/04* (2013.01)

(58) Field of Classification Search
None
See application file for complete search history.

(56) References Cited

U.S. PATENT DOCUMENTS

| | | |
|---|---|---|
| 2,834,751 A | 5/1958 | Jones |
| 2016/0215127 A1 | 7/2016 | Sawada et al. |
| 2017/0226233 A1* | 8/2017 | Yamashiro ............ B60C 1/0016 |
| 2019/0010313 A1 | 1/2019 | Yamashiro et al. |
| 2019/0309146 A1 | 10/2019 | Yokoyama et al. |
| 2020/0055964 A1 | 2/2020 | Yamamoto |

FOREIGN PATENT DOCUMENTS

| | | |
|---|---|---|
| JP | 2016-56351 A | 4/2016 |
| JP | 2018-95776 A | 6/2018 |
| JP | 6417064 B1 | 10/2018 |
| WO | WO 2015/064646 A1 | 5/2015 |

OTHER PUBLICATIONS

Japanese Office Action issued on Sep. 12, 2023 in the corresponding Japanese Patent Application No. 2020-569621 (with Unedited Computer-Generated English Translation), 8 pages.
International Search Report issued Apr. 14, 2020 in PCT/JP2020/002814 filed Jan. 27, 2020, 2 pages.
Extended European Search Report issued Sep. 27, 2022 in European Patent Application No. 20748428.8, 6 pages.
Office Action issued Feb. 6, 2024, in corresponding Japanese Patent Application No. 2020-569621 (with Computer-Generated English Translation), 8 pages.

* cited by examiner

*Primary Examiner* — Robert T Butcher
(74) *Attorney, Agent, or Firm* — Oblon, McClelland, Maier & Neustadt, L.L.P.

(57) ABSTRACT

Provided is a rubber composition containing: (A) a polymer which has a carbon-carbon unsaturated bond and in which a value a represented by the following equation (i) is 0.70 or more and 0.99 or less when p, q, r, and s are defined as constituent proportions (molar proportions), in the polymer, of a structural unit represented by the following formula (1), a structural unit represented by the following formula (2), a structural unit represented by the following formula (3), and a structural unit represented by the following formula (4), respectively; and (B) a thermoplastic resin, in which the polymer (A) is contained in an amount of 60% to 95% by mass relative to the total amount of the polymer (A) and the resin (B), $$\alpha = (p + (0.5 \times r))/(p + q + (0.5 \times r) + s) \quad (i)$$

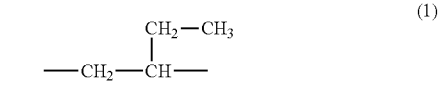

(1)

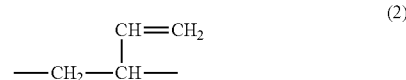

(2)

—CH$_2$—CH$_2$— (3)

—CH$_2$—CH═CH—CH$_2$— (4)

6 Claims, No Drawings

RUBBER COMPOSITION, CROSSLINKED BODY, AND TIRE

CROSS-REFERENCE TO RELATED APPLICATIONS

The present application is based on Japanese Patent Application No. 2019-14823 filed on Jan. 30, 2019, and the contents thereof are incorporated herein.

TECHNICAL FIELD

The present disclosure relates to a rubber composition, a crosslinked body, and a tire, and more specifically to a rubber composition suitable for a tire, and the like.

BACKGROUND ART

Polymers having a carbon-carbon unsaturated bond, such as a conjugated diene-based polymer, have been widely used as a rubber material. Among these, a conjugated diene-based polymer (for example, a styrene-butadiene copolymer) is satisfactory in various characteristics such as heat resistance, abrasion resistance, mechanical strength, and formability, and has been widely used in various industrial products such as a pneumatic tire, an anti-vibration rubber, and a hose. It has been proposed to obtain a high-strength and low-wear crosslinked rubber by using a hydrogenated conjugated diene-based polymer obtained by hydrogenating a part of unsaturated bonds of a conjugated diene-based polymer (see, for example, Patent Literature 1).

CITATION LIST

Patent Literature

Patent Literature 1: WO2015/064646

SUMMARY OF INVENTION

Technical Problem

Extending a service life of a rubber product to increase the number of years of use contributes to a reduction in environmental load. In tire applications, a degree of deterioration of a tire affects high-speed performance and running stability of a vehicle. Thus, a material for giving a crosslinked rubber having excellent fatigue resistance (crack growth resistance as one of typical parameters) and abrasion resistance and having higher strength has been demanded.

The present disclosure has been made in view of the above, and a main object thereof is to provide a rubber composition which can give a crosslinked rubber having excellent abrasion resistance and crack growth resistance and having high strength.

Solution to Problem

As a result of intensive studies for solving the problems of the conventional art as described above, the present inventors have found that the problems can be solved by subjecting a rubber composition containing a highly saturated diene-based polymer and a thermoplastic resin to a crosslinking treatment. Specifically, the present disclosure provides the following means.

[1] A rubber composition, comprising:
(A) a polymer which has a carbon-carbon unsaturated bond, and in which a value a represented by the following equation (i) is 0.70 or more and 0.99 or less when p, q, r, and s are defined as component proportions (molar proportions), in the polymer, of a structural unit represented by the following formula (1), a structural unit represented by the following formula (2), a structural unit represented by the following formula (3), and a structural unit represented by the following formula (4), respectively; and
(B) a thermoplastic resin,
wherein the polymer (A) is contained in an amount of 60% to 95% by mass relative to the total amount of the polymer (A) and the resin (B), $$\alpha = (p+(0.5 \times r))/(p+q+(0.5 \times r)+s) \quad (i)$$

(1)

(2)

$-CH_2-CH_2-$ (3)

$-CH_2-CH=CH-CH_2-$ (4)

[2] A crosslinked body, which is obtained by using a rubber composition containing the polymer (A) and the resin (B).

[3] A tire wherein one or both of a tread and a sidewall are formed by the crosslinked body according to the above [2].

Advantageous Effects of Invention

Based on the present disclosure, a crosslinked rubber in which abrasion resistance, crack growth resistance, and strength are improved to be well-balanced can be obtained by using a rubber composition in which a highly saturated diene-based polymer and a thermoplastic resin are blended at a given ratio.

DESCRIPTION OF EMBODIMENTS

The following will describe the items relating to the embodiments of the present disclosure in detail.

<<Rubber Composition>>

A rubber composition according to the present disclosure contains a highly saturated diene-based polymer and a thermoplastic resin.

<Highly Saturated Diene-based Polymer>

The highly saturated diene-based polymer according to the present disclosure (hereinafter, also referred to as "polymer (A)") is a polymer having a carbon-carbon unsaturated bond. In the polymer (A), a value a represented by the following equation (i) is 0.70 or more and 0.99 or less, when p, q, r, and s are defined as component proportions (molar proportions), in the polymer, of a structural unit represented by the following formula (1), a structural unit represented by the following formula (2), a structural unit represented by the following formula (3), and a structural unit represented by the following formula (4), respectively.

$$\alpha = (p+(0.5 \times r))/(p+q+(0.5 \times r)+s) \quad (i)$$

The polymer (A) can be produced, for example, by a method including a step (polymerization step) of polymerizing a monomer containing butadiene to obtain a conjugated diene-based polymer having an active chain end, and a step (hydrogenation step) of hydrogenating the conjugated diene-based polymer. The method may optionally include a step (modification step) of modifying the chain end of the conjugated diene-based polymer obtained in the polymerization step. Specifically, in accordance with a method described in WO2014/133097, a molecular weight, an amount of aromatic vinyl compound, a content of vinyl bond, a rate of hydrogenation, a kind of a modifier, and the like can be appropriately changed so as to meet the purpose of use. The polymer (A) can also be produced by copolymerizing a diene-based monomer such as 1,3-butadiene, and a non-conjugated olefin according to a method described in WO2015/190073. Hereinafter, the polymer (A) and the method for producing the same will be described in detail using a hydrogenated conjugated diene-based polymer as an example.

(Polymerization Step)

When the polymer (A) is a hydrogenated conjugated diene-based polymer, a conjugated diene-based polymer before hydrogenation is a polymer having a structural unit derived from a conjugated diene compound. The conjugated diene-based polymer before hydrogenation is preferably a copolymer having a structural unit derived from a conjugated diene compound and a structural unit derived from an aromatic vinyl compound. This polymerization step is a step of polymerizing a monomer containing a conjugated diene compound, preferably a conjugated diene compound and an aromatic vinyl compound, to obtain the conjugated diene-based polymer having an active chain end.

In the polymerization, 1,3-butadiene can be preferably used as the conjugated diene compound. In the polymerization, a conjugated diene compound other than 1,3-butadiene may be used in addition to 1,3-butadiene. Such a conjugated diene compound is preferably copolymerizable with 1,3-butadiene and an aromatic vinyl compound. Specific examples of the conjugated diene compound other than 1,3-butadiene include isoprene, 2,3-dimethyl-1,3-butadiene, and 1,3-pentadiene. Among them, isoprene is preferable. One of the conjugated diene compounds may be used alone or two or more thereof may be used in combination.

Examples of the aromatic vinyl compound include styrene, 2-methylstyrene, 3-methylstyrene, 4-methylstyrene, α-methylstyrene, N,N-dimethylaminoethylstyrene, and diphenylethylene. Among these, the aromatic vinyl compound is particularly preferably one or more compounds selected from styrene and α-methylstyrene. One of the aromatic vinyl compounds may be used alone or two or more thereof may be used in combination.

The conjugated diene-based polymer obtained by the polymerization step may be a homopolymer of a conjugated diene compound, or may be a copolymer of a conjugated diene compound and an aromatic vinyl compound. The copolymer of a conjugated diene compound and an aromatic vinyl compound is preferable. The copolymer may also be a copolymer using 1,3-butadiene and a conjugated diene compound other than 1,3-butadiene as the conjugated diene compounds. From the viewpoint of high living property in anionic polymerization, the conjugated diene-based polymer is preferably a copolymer of 1,3-butadiene and styrene.

In the copolymer of a conjugated diene compound and an aromatic vinyl compound, an amount of the aromatic vinyl compound to be used is preferably 10% to 50% by mass, and more preferably 15% to 40% by mass, relative to the total amount of monomers used for polymerization, from the viewpoint of improving low hysteresis loss characteristics of the crosslinked rubber. When a content of the aromatic vinyl compound is within the above range, both of productivity and strength can be achieved. The monomer used for production of the conjugated diene-based polymer before hydrogenation preferably contains 50 to 90 parts by mass of butadiene, 10 to 50 parts by mass of an aromatic vinyl compound, and 0 to 40 parts by mass of a conjugated diene compound other than butadiene, relative to 100 parts by mass of the monomer. Such a blending amount is preferable from the viewpoint of achieving both of productivity and strength of the crosslinked rubber.

The conjugated diene compound and the aromatic vinyl compound exemplified above have the same effect in that a conjugated diene-based polymer having an active chain end can be obtained. Therefore, even those not described in the examples described later can be used in the present disclosure.

In the polymerization, a monomer other than the conjugated diene compound and the aromatic vinyl compound may be used. Examples of another monomer include acrylonitrile, methyl(meth)acrylate, and ethyl(meth)acrylate. An amount of another monomer to be used is preferably 40% by mass or less, more preferably 30% by mass or less, and still more preferably 20% by mass or less, relative to the total amount of the monomers used for polymerization.

As a polymerization method for obtaining the conjugated diene-based polymer according to the present disclosure, any of a solution polymerization, a gas phase polymerization, and a bulk polymerization may be used, but a solution polymerization is particularly preferable. Moreover, as a polymerization process, either of a batch-wise process and a continuous process may be used. When the solution polymerization is used, examples of a specific polymerization include a method of polymerizing the monomer containing the conjugated diene compound in an organic solvent in the presence of a polymerization initiator and a randomizer that is used as needed.

At least one of an alkali metal compound and an alkaline earth metal compound may be used as the polymerization initiator. As the alkali metal compound and the alkaline earth metal compound, those usually used as an initiator of anion polymerization can be used, and examples thereof include alkyllithium such as methyllithium, ethyllithium, n-propyllithium, n-butyllithium, sec-butyllithium and t-butyllithium, 1,4-dilithiobutane, phenyllithium, stilbene lithium, naphthyllithium, naphthylsodium, naphthylpotassium, di-n-butylmagnesium, di-n-hexylmagnesium, ethoxypotassium, and calcium stearate. Among these, lithium compounds are preferable.

A polymerization reaction may be performed in the presence of a compound (hereinafter, also referred to as a compound (R)) obtained by mixing at least one of the alkali metal compound and the alkaline earth metal compound and a compound (hereinafter, also referred to as a compound (C1)) having a functional group that interacts with silica. By performing polymerization in the presence of the compound (R), a functional group that interacts with silica can be introduced into a polymerization initiation end of the conjugated diene-based polymer. In the present specification, the term "interaction" means that a covalent bond is formed between molecules, or that an intermolecular force (intermolecular electromagnetic force such as ion-dipole interaction, dipole-dipole interaction, a hydrogen bond, or Van der Waals force) that is weaker than a covalent bond is formed. The term "functional group that interacts with silica" refers to a group having at least one atom such as a nitrogen atom, a sulfur atom, a phosphorus atom, or an oxygen atom that interacts with silica.

The compound (R) is preferably a reaction product of a lithium compound such as alkyllithium and a nitrogen-containing compound such as a secondary amine compound. Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine and 1,3-ditrimethylsilyl-1,3,5-triazinane. When the polymerization is performed in the presence of the compound (R), the compound (R) may be prepared by mixing at least one of the alkali metal compound and the alkaline earth metal compound and the compound (C1) previously, and the prepared compound (R) may be added to a polymerization system to perform the polymerization. Alternatively, the compound (R) may be prepared by adding at least one of the alkali metal compound and the alkaline earth metal compound and the compound (C1) to the polymerization system and mixing the two compounds in the polymerization system, and then the polymerization may be performed.

The randomizer can be used for the purpose of adjusting a proportion of the content of vinyl bonds (vinyl content) and the like. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, and tetramethylethylenediamine. One of these compounds may be used alone or two or more thereof may be used in combination.

The organic solvent to be used in the polymerization may be an organic solvent that is inert to the reaction. For example, an aliphatic hydrocarbon, an alicyclic hydrocarbon or an aromatic hydrocarbon can be used. Of these, a hydrocarbon having 3 to 8 carbon atoms is preferable and examples thereof include n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene and cyclohexene. One of the organic solvents may be used alone or two or more thereof may be used in combination.

When the solution polymerization is used, a monomer concentration in a reaction solvent is preferably 5% to 50% by mass, and more preferably 10% to 30% by mass, from the viewpoint of maintaining a balance between productivity and easiness of polymerization control. A temperature of the polymerization reaction is preferably −20° C. to 150° C., more preferably 0 to 120° C., and particularly preferably 20° C. to 100° C. The polymerization reaction is preferably performed under a pressure sufficient to substantially maintain the monomer in a liquid phase. Such a pressure may be achieved by a method of pressurizing the reactor using an inert gas to the polymerization reaction and the like.

In this manner, the conjugated diene-based polymer having an active chain end can be obtained. The conjugated diene-based polymer preferably has a weight-average molecular weight (Mw) of $1.0 \times 10^5$ to $2.0 \times 10^6$. When Mw is less than $1.0 \times 10^5$, the abrasion resistance and fuel economy of the resulting crosslinked rubber tends to decrease. When Mw is more than $2.0 \times 10^6$, the formability tends to decrease. Mw is more preferably $1.0 \times 10^5$ or more, still more preferably $1.5 \times 10^5$ or more. Mw is more preferably $1.5 \times 10^6$ or less, still more preferably $1.0 \times 10^6$ or less.

A 1,2-vinyl content of the conjugated diene-based polymer obtained by the polymerization is preferably 5% by mass or more, more preferably 10% by mass or more, and still more preferably 15% by mass or more. The 1,2-vinyl content is preferably 70% by mass or less, more preferably 60% by mass or less, and still more preferably 50% by mass or less. When the 1,2-vinyl content is less than 5% by mass, grip characteristics tend to be low. When the 1,2-vinyl content is more than 70% by mass, the abrasion resistance tends to deteriorate. The 1,2-vinyl content is a value measured by $^1$H-NMR.

The conjugated diene-based polymer before hydrogenation according to the present disclosure is preferably a random copolymer of a structural unit derived from a conjugated diene compound and a structural unit derived from an aromatic vinyl compound. This is preferable in that the dispersibility of a filler can be further improved. The random copolymer may have a block portion including a conjugated diene compound at one end or both ends.

(Modification Step)

The modification step is a step of allowing an active chain end of the conjugated diene-based polymer obtained in the polymerization step to react with a compound (hereinafter, also referred to as a compound (C2)) having a functional group that interacts with silica. This step allows the functional group that interacts with silica to be introduced into a polymerization terminating end of the conjugated diene-based polymer. In the present specification, the active chain end means a portion (more specifically, a metal chain end) other than a structure derived from a monomer having a carbon-carbon double bond, which is present at an end of a molecular chain.

The conjugated diene-based polymer to be used in the modification reaction (hereinafter, also referred to as an end modification reaction) in this step may have an unmodified or modified polymerization initiation end as long as the conjugated diene-based polymer has an active chain end. The compound (C2) is not limited as long as the compound is a compound that reacts with the active chain end of the conjugated diene-based polymer. The compound (C2) is preferably a compound which has one or more functional groups selected from the group consisting of an amino group, a group having a carbon-carbon double bond, a nitrogen-containing heterocyclic group, a phosphino group, an epoxy group, a thioepoxy group, a protected hydroxyl group, a protected thiol group, and a hydrocarbyloxysilyl group, and which can react with a polymerization active chain end, from the viewpoint of allowing for improving fuel economy of the crosslinked body obtained using the rubber composition according to the present disclosure. The amino group includes a protected primary amino group, a protected secondary amino group, and a tertiary amino group. Specifically, for the compound (C2), at least one selected from the group consisting of a compound represented by the following formula (9), a compound represented by the following formula (10), a compound represented by the following formula (11), and a compound represented by the following formula (12) can be preferably used.

[Chem 2]

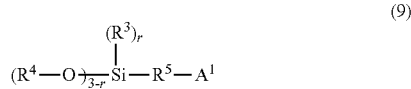

(9)

(In the formula (9), $A^1$ is a monovalent functional group having at least one atom selected from the group consisting of nitrogen, phosphorus, oxygen, sulfur and silicon and bonding to $R^5$ with a nitrogen atom, a phosphorus atom, an oxygen atom, a sulfur atom, a silicon atom or a carbon atom contained in a carbonyl group, or a (thio)epoxy group; $R^3$ and $R^4$ are hydrocarbyl groups, $R^5$ is a hydrocarbylene group, and r is an integer of 0 to 2; provided that there is more than one $R^3$, $R^3$s are the same group or different groups from each other; and provided that there is more than one $R^4$, $R^4$s are the same group or different groups from each other.)

[Chem 3]

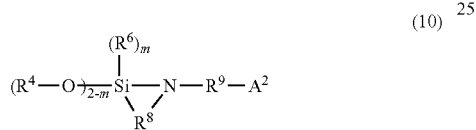

(10)

(In the formula (10), $A^2$ is a monovalent functional group having at least one atom selected from the group consisting of nitrogen, phosphorus, oxygen, sulfur and silicon, having no active hydrogen, and bonding to $R^9$ with a nitrogen atom, a phosphorus atom, an oxygen atom, a sulfur atom or a silicon atom, or a hydrocarbyl group having 1 to 20 carbon atoms; $R^6$ and $R^7$ are each independently a hydrocarbyl group; $R^8$ is a hydrocarbylene group; $R^9$ is a single bond or a hydrocarbylene group, and m is 0 or 1; and provided that there is more than one R, $R^7$s are the same group or different groups from each other.)

[Chem 4]

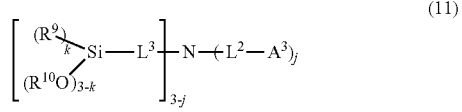

(11)

(In the formula (11), $A^3$ is a monovalent group bonding to $L^2$ with an imino group, an amide group, a (thio)carbonyl group, a (thio)carbonyloxy group, a sulfide group or a polysulfide group, or is a protected primary amino group, a protected secondary amino group, a tertiary amino group, a nitrile group, a pyridyl group, a (thio)epoxy group, a (thio)isocyanate group, a (thio)formyl group, a (thio)carboxylic acid ester group, a metal salt of a (thio)carboxylic acid ester group, —COX$^1$ (X$^1$ is a halogen atom), an imidazolyl group or a group represented by the following formula (11a); $L^2$ and $L^3$ are each independently a single bond or a hydrocarbylene group having 1 to 20 carbon atoms, and $R^9$ and $R^{10}$ are each independently a hydrocarbyl group, K is an integer of 0 to 2, and j is 0 or 1; and when the formula includes more than one of the same symbols for each symbol of $R^9$, $R^{10}$ and $L^3$, the groups represented by the symbols are the same group or different groups from each other; when there is more than one k in the formula, and k's are the same number or different numbers.)

[Chem 5]

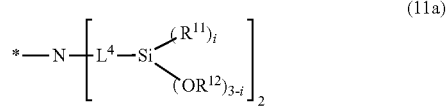

(11a)

(In the formula (11a), $L^4$ is a single bond or a hydrocarbylene group having 1 to 20 carbon atoms, and $R^{11}$ and $R^{12}$ are each independently a hydrocarbyl group, and i is an integer of 0 to 3; "*" represents a site that bonds to $L^2$; for each symbol of $R^{11}$, $R^{12}$, and $L^4$, the groups represented by the symbols are the same group or different groups from each other; and more than one i in the formula is the same number or different numbers.)

[Chem 6]

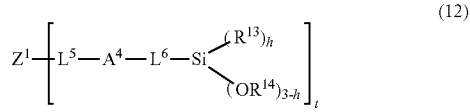

(12)

(In the formula (12), $A^4$ is an imino group, an amide group, a (thio)carbonyl group, or a (thio)carbonyloxy group; $Z^1$ is a t-valent group having 1 to 20 carbon atoms and having a nitrogen atom or having no nitrogen atom; $L^5$ is a single bond or a hydrocarbylene group having 1 to 20 carbon atoms; $L^6$ is a hydrocarbylene group having 1 to 20 carbon atoms; and $R^{13}$ and $R^{14}$ are each independently a hydrocarbyl group, h is 0 or 1 and t is 2 or 3; for each symbol of $R^{14}$, $L^5$, $L^6$, and $A^4$, the groups represented by the symbols are the same group or different groups from each other; and more than one h in the formula is the same number or different numbers.)

In the formulae (9) and (10), the hydrocarbyl groups of $R^3$, $R^4$, $R^6$ and $R^7$ are preferably a linear or branched alkyl group having 1 to 20 carbon atoms, a cycloalkyl group having 3 to 20 carbon atoms, or an aryl group having 6 to 20 carbon atoms.

$R^5$ and $R^9$ are preferably a linear or branched alkanediyl group having 1 to 20 carbon atoms, a cycloalkylene group having 3 to 20 carbon atoms, or an arylene group having 6 to 20 carbon atoms.

r and m are preferably 0 or 1 from the viewpoint of increasing the reactivity with the conjugated diene-based polymer.

When $A^1$ is the monovalent functional group, at least one atom selected from the group consisting of nitrogen, phosphorus, oxygen, sulfur, and silicon, which $A^1$ has, and at least one atom selected from the group consisting of nitrogen, phosphorus, oxygen, sulfur, and silicon, which $A^2$ has, preferably do not bond to active hydrogen, and more preferably are protected by a protective group (for example, a trisubstituted hydrocarbylsilyl group). As used herein, the term "active hydrogen" refers to a hydrogen atom that bonds to an atom other than a carbon atom, and preferably refers to a hydrogen atom having a bond energy lower than that of a carbon-hydrogen bond of polymethylene. The protective group is a functional group that converts $A^1$ and $A^2$ into a functional group that is inert to the polymerization active chain end. The (thio)epoxy group includes an epoxy group and a thioepoxy group.

$A^1$ may be a group that can be turned into an onium ion by an onium salt-producing agent. When the compound (C2) has such a group ($A^1$), excellent shape retainability can be imparted to the hydrogenated conjugated diene-based polymer.

Specific examples of $A^1$ include a group containing a nitrogen-containing group in which two hydrogen atoms of a primary amino group are substituted with two protective groups, a nitrogen-containing group in which one hydrogen atom of a secondary amino group is substituted with one protective group, a tertiary amino group, an imino group, a pyridyl group, a phosphorus-containing group in which two hydrogen atoms of a primary phosphino group are substituted with two protective groups, a phosphorus-containing group in which one hydrogen atom of a secondary phosphino group is substituted with one protective group, a tertiary phosphino group, an epoxy group, a group in which a hydrogen atom of a hydroxyl group is protected with a protective group, a thioepoxy group, a sulfur-containing group in which a hydrogen atom of a thiol group is substituted with a protective group, or a group containing a hydrocarbyloxycarbonyl group. Among these, from the viewpoint of good affinity with silica, a group having a nitrogen atom is preferable, and a group containing a tertiary amino group, a nitrogen-containing group in which one hydrogen atom of a secondary amino group is substituted with one protective group, or a nitrogen-containing group in which two hydrogen atoms of a primary amino group are substituted with two protective groups is more preferable.

In the formula (11), examples of the hydrocarbylene group having 1 to 20 carbon atoms of $L^2$ and $L^3$ include a linear or branched alkanediyl group having 1 to 20 carbon atoms, a cycloalkylene group having 3 to 20 carbon atoms, and an arylene group having 6 to 20 carbon atoms. Examples of the hydrocarbyl group of $R^9$ and $R^{10}$ include a linear or branched alkyl group having 1 to 4 carbon atoms, and a cycloalkyl group having 3 or 4 carbon atoms. The (thio) carbonyl group includes a carbonyl group and a thiocarbonyl group, the (thio)carbonyloxy group includes a carbonyloxy group and a thiocarbonyloxy group, the (thio)isocyanate group includes an isocyanate group and a thioisocyanate group, the (thio)formyl group includes a formyl group and a thioformyl group, and the (thio)carboxylic acid ester group includes a carboxylic acid ester group and a thiocarboxylic acid ester group.

In the formula (12), $Z^1$ is preferably a divalent or trivalent group having 1 to 20 carbon atoms which may contain a nitrogen atom, and preferably contains a nitrogen atom. Examples of the hydrocarbylene group having 1 to 20 carbon atoms of $L^5$ and $L^6$ include a linear or branched alkanediyl group having 1 to 20 carbon atoms, a cycloalkylene group having 3 to 20 carbon atoms, and an arylene group having 6 to 20 carbon atoms. Examples of the hydrocarbyl group of $R^{13}$ and $R^{14}$ include a linear or branched alkyl group having 1 to 4 carbon atoms, and a cycloalkyl group having 3 or 4 carbon atoms.

Preferred specific examples of the compound (C2) include N,N-bis(trimethylsilyl)aminopropyltrimethoxysilane, N,N-bis(trimethylsilyl)aminopropylmethyldiethoxysilane, N,N', N'-tris(trimethylsilyl)-N-(2-aminoethyl)-3-aminopropyltri-ethoxysilane, 3-(4-trimethylsilyl-1-piperazino) propylmethyldimethoxysilane, 3-glycidoxypropylmethyldimethoxysilane, 3-glycidoxypropyltriethoxysilane as the compound represented by the formula (9); and 2,2-dimethoxy-1-(3-trimethoxysilylpropyl)-1, 2-azasilolidine, 2,2-diethoxy-1-(3-trimethoxysilylpropyl)-1, 2-azasilolidine, 2,2-dimethoxy-1-phenyl-1,2-azasilolidine, 1-trimethylsilyl-2,2-dimethoxy-1-aza-2-silacyclopentane, 2-(2,2-dimethoxy-1,2-azasilo idin-1-yl)-N,N-diethylethane-1-amine, 2-(2,2-dimethoxy-1,2-azasilolidin-1-yl)-N,N-dimethylethane-1-amine, 3-(2,2-dimethoxy-1,2-azasilolidin-1-yl)-N,N-diethylpropane-1-amine as the compound represented by the formula (10).

Preferred specific examples of the compound (C2) include N,N-bis(trimethoxysilylpropyl)aminopropyl-3-(1-imidazole), N,N-bis(triethoxysilylpropyl)aminopropyl-3-(1-imidazole), N,N-bis(trimethoxysilylpropyl)aminopropylmethyldiethylsilane, N,N,N-tris(triethoxysilylpropyl)amine, N,N,N',N'-tetrakis(3-triethoxysilylpropyl)-1,3-diaminopropane as the compound represented by the formula (11); a compound represented by the following formulae (M-1) to (M-4),

[Chem 7]

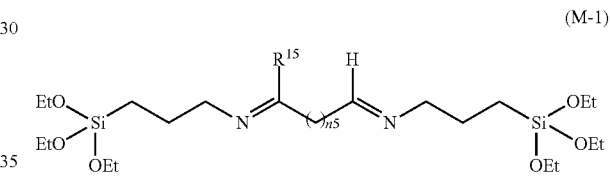

(M-1)

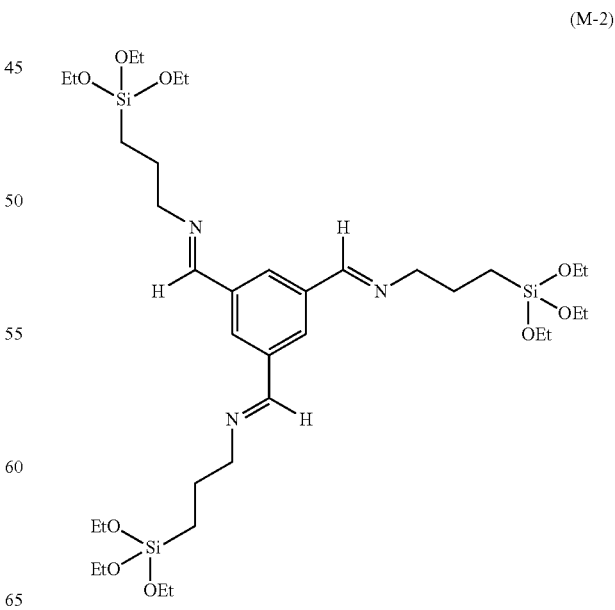

(M-2)

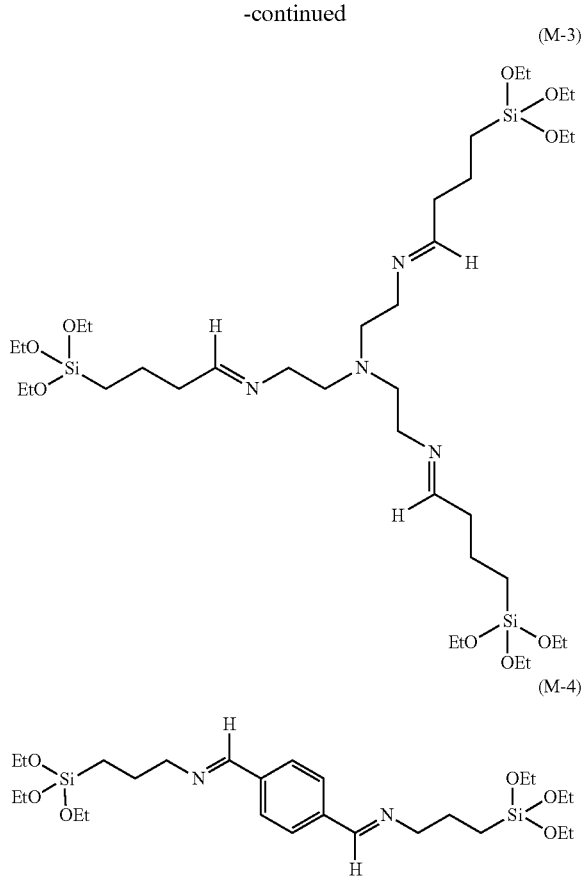

(M-3)

(M-4)

where $R^{15}$ is a hydrogen atom or an alkyl group having 1 to 20 carbon atoms, and n5 is an integer of 1 to 10 in the formula (M-1) as the compound represented by the formula (12); and 2,2-dimethoxy-8-(4-methylpiperazinyl)methyl-1,6-dioxa-2-silacyclooctane as compounds other than the above. One of the compounds (C2) may be used alone or two or more thereof may be used in combination.

The end modification reaction can be performed, for example, as a solution reaction. The solution reaction may be performed using a solution containing an unreacted monomer after the completion of the polymerization reaction in the polymerization step, or may be performed after the conjugated diene-based polymer contained in the solution is isolated and dissolved in an appropriate solvent such as cyclohexane. The end modification reaction may be performed using one of a batch system and a continuous system. In this case, a method of adding the compound (C2) is not limited, but examples thereof include a method of adding the compound (C2) collectively, a method of adding the compound (C2) separately, and a method of adding the compound (C2) continuously.

An amount of the compound (C2) to be used in the end modification reaction may be appropriately set depending on a kind of the compound used in the reaction, but is preferably 0.1 molar equivalent or more, more preferably 0.3 molar equivalent or more, relative to the metal atom participating in the polymerization reaction, which is contained in the polymerization initiator. When the amount of the compound (C2) to be used is 0.1 molar equivalents or more, the modification reaction can be sufficiently progressed, and the dispersibility of silica can be suitably improved.

A temperature of the end modification reaction is generally the same as the temperature of the polymerization reaction, and is preferably −20° C. to 150° C., more preferably 0 to 120° C., and particularly preferably 20° C. to 100° C. When the temperature of the modification reaction is low, the viscosity of the modified conjugated diene-based polymer tends to increase. On the other hand, when the temperature of the modification reaction is high, the polymerization active chain end is easily deactivated. A reaction time of the modification reaction is preferably 1 minute to 5 hours, and more preferably 2 minutes to 1 hour.

(Hydrogenation Reaction)

The hydrogenated conjugated diene-based polymer according to the present disclosure can be obtained by hydrogenating the modified or unmodified conjugated diene-based polymer obtained above. For a method and conditions for the hydrogenation reaction, any method and conditions may be used as long as the conjugated diene-based polymer having a desired rate of hydrogenation can be obtained. Examples of the hydrogenation method include a method in which a catalyst containing an organometallic compound of titanium as a main component is used as a hydrogenation catalyst, a method in which a catalyst containing an organometallic compound of iron, nickel or cobalt and an organometallic compound such as alkylaluminum is used, a method in which an organic complex of an organometallic compound of ruthenium or rhodium is used, and a method in which a catalyst in which a metal such as palladium, platinum, ruthenium, cobalt or nickel is supported on a support such as carbon, silica, or alumina is used. Among the various methods, a method of performing hydrogenation under mild conditions of low pressure and low temperature using an organometallic compound of titanium alone or a homogeneous catalyst containing an organometallic compound of titanium and an organometallic compound of lithium, magnesium, or aluminum (JP-B-S63-4841 and JP-B-H1-37970) is industrially preferable, and the hydrogenation selectivity to a double bond of butadiene is also high and suitable for the purpose of the present disclosure.

The hydrogenation of the modified conjugated diene-based polymer is performed in a solvent that is inert to the catalyst and in which the conjugated diene-based polymer is soluble. Preferred examples of the solvent include aliphatic hydrocarbons such as n-pentane, n-hexane, and n-octane, alicyclic hydrocarbons such as cyclohexane and cycloheptane, aromatic hydrocarbons such as benzene and toluene, ethers such as diethyl ether and tetrahydrofuran alone, and mixtures containing these as main components.

The hydrogenation reaction is basically performed by keeping the conjugated diene-based polymer at a given temperature under a hydrogen or inert atmosphere, adding a hydrogenation catalyst under stirring or under non-stirring, then introducing a hydrogen gas, and pressurizing the whole to a given pressure. The inert atmosphere means an atmosphere which does not react with any components that participate in the hydrogenation reaction and examples thereof include helium, neon, and argon. Air and oxygen is not preferred since air and oxygen causes deactivation of the catalyst through oxidation of the catalyst. Moreover, nitrogen is not preferred since nitrogen acts as a catalyst poison at the hydrogenation reaction and lowers hydrogenation activity. Particularly, it is suitable that an inside of a hydrogenation reactor is an atmosphere of hydrogen gas alone.

A hydrogenation reaction process for obtaining the hydrogenated conjugated diene-based polymer may be any of a batch process, a continuous process, and a combination thereof. When a titanocene diaryl-based compound is used as the hydrogenation catalyst, the titanocene diaryl-based compound may be added alone to the reaction solution as it is, or may be added as a solution of an inert organic solvent. For the inert organic solvent used in the case of using the catalyst as a solution, various solvents that do not react with the components that participate in the hydrogenation reaction can be used. The solvent is preferably the same as the solvent used in the hydrogenation reaction. The amount of the catalyst to be added is preferably 0.02 mmol to 20 mmol per 100 g of the conjugated diene-based polymer before hydrogenation.

In the hydrogenated conjugated diene-based polymer according to the present disclosure, a in the equation (i) (that is, $\alpha=(p+(0.5 \times r))/(p+q+(0.5 \times r)+s)$) is 0.70 or more and 0.99 or less. 0.70 or more of a allows for providing a crosslinked rubber having high strength and excellent abrasion resistance and crack growth resistance. For this reason, a is preferably 0.75 or more, more preferably 0.80 or more, and particularly preferably 0.90 or more. α in the above equation (i) corresponds to a rate of hydrogenation of the hydrogenated conjugated diene-based polymer. For example, when a is 0.70, the rate of hydrogenation of the hydrogenated conjugated diene-based polymer is 70%. The rate of hydrogenation of the hydrogenated conjugated diene-based polymer can be adjusted by, for example, a time of the hydrogenation reaction. The rate of hydrogenation can be measured by $^1$H-NMR. When the polymer (A) is a polymer obtained by copolymerizing a diene-based monomer and a non-conjugated olefin, a value of a can be adjusted by changing a ratio of monomers to be copolymerized.

A preferred method for obtaining the hydrogenated conjugated diene-based polymer according to the present disclosure is that a monomer containing butadiene is subjected to solution polymerization in the presence of an alkali metal compound, the modification step is performed using the resulting polymer solution as it is, and then the resultant one is subjected to the hydrogenation step, which is industrially useful. In this case, the hydrogenated conjugated diene-based polymer is obtained by removing the solvent from the solution obtained above to isolate the polymer. Isolation of the polymer can be performed, for example, by a known desolvation method such as steam stripping and a drying operation such as heat treatment.

The polymer (A) preferably has one or more functional groups selected from the group consisting of an amino group, a nitrogen-containing heterocyclic group, a phosphino group, a hydroxyl group, a thiol group and a hydrocarbyloxysilyl group, and more preferably has one or more functional groups selected from the group consisting of an amino group, a nitrogen-containing heterocyclic group and a hydrocarbyloxysilyl group, from the viewpoint of further enhancing the fuel economy of the crosslinked body obtained using the rubber composition. These functional groups are particularly preferably introduced into the end of the polymer (A) from the viewpoint of further enhancing the effect of improving fuel economy.

<Thermoplastic Resin>

The thermoplastic resin (hereinafter, also referred to as "resin (B)") contained in the rubber composition according to the present disclosure is preferably at least one selected from the group consisting of a styrene-based resin, polyethylene, a C5-based resin, a C9-based resin, a C5/C9-based resin, a dicyclopentadiene-based resin, and an alkylphenol-based resin, from the viewpoint of obtaining a crosslinked rubber having more excellent characteristics such as strength, abrasion resistance, and crack growth resistance. One of the thermoplastic resins may be used alone or two or more thereof may be used in combination.

Here, the styrene-based resin is a polymer obtained using a styrene-based monomer, and among these, is preferably a polymer having a structural unit derived from a styrene-based monomer in an amount of 20% by mass or more relative to the total amount of monomer units of the styrene-based resin. Examples of the styrene-based monomer include styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, and p-chlorostyrene. Among these, the styrene-based monomer is preferably at least one of styrene and α-methylstyrene.

The styrene-based resin may be a homopolymer obtained by polymerizing one kind of styrene-based monomer, or may be a copolymer obtained by copolymerizing two or more kinds of styrene-based monomers. The styrene-based resin may be a copolymer obtained by using a styrene-based monomer and another monomer copolymerizable with the styrene-based monomer. Examples of another monomer include unsaturated carboxylic acids such as acrylonitriles such as acrylonitrile and methacrylonitrile, acrylic and methacrylic acid; unsaturated carboxylic acid esters such as methyl acrylate and methyl methacrylate; dienes such as chloroprene and butadiene isoprene; olefins such as 1-butene and 1-pentene, an α,β-unsaturated carboxylic acid such as maleic anhydride or an acid anhydride thereof.

A softening point of the styrene-based resin is preferably 30° C. or higher, more preferably 60° C. or higher, and still more preferably 80° C. or higher. When the softening point is 30° C. or higher, the effect of improving the crack growth resistance tends to be easily obtained in the crosslinked rubber. The softening point of the styrene-based resin is preferably 160° C. or lower, more preferably 130° C. or lower, and still more preferably 100° C. or lower. When the softening point is 160° C. or lower, the dispersibility of the resin tends to be good, and the crack growth resistance, the abrasion resistance, and the tensile strength at break tend to be easily improved. In the present disclosure, the softening point of the styrene-based resin is a value measured using a ring and ball softening point measuring device according to a method defined in JIS K6220-1:2015, and is a temperature at which a sample is softened and a ball placed on the sample is lowered onto a bottom plate.

As the styrene-based resin, a block polymer (thermoplastic elastomer) having a conjugated diene-based polymer block as a soft segment and a polystyrene-based block as a hard segment can also be used. The use of such a block polymer allows for further enhancing the effect of improving the crack growth resistance, which is preferable. In the conjugated diene-based polymer block of the block polymer, carbon-carbon double bonds in the structural unit derived from the conjugated diene compound may be partially hydrogenated.

Examples of the conjugated diene compound constituting the conjugated diene-based polymer block include 1,3-butadiene, isoprene, 2,3-dimethyl-1,3-butadiene, 1,3-pentadiene, and 1,3-hexadiene. One of the conjugated diene compounds may be used alone or two or more thereof may be used in combination. Among these, the conjugated diene compound is preferably at least one of 1,3-butadiene and isoprene. A proportion of the content of a conjugated diene unit in the block polymer is preferably 20% by mass or more, and more preferably 30% by mass or more. The proportion of the content of the conjugated diene unit is preferably 80% by mass or less, and more preferably 70% by mass or less.

A proportion of the content of the polystyrene-based block in the block polymer is preferably 20% by mass or more from the viewpoint of further increasing the tensile strength at break. The proportion of the content of the polystyrene-based block is preferably 80% by mass or less, and more preferably 70% by mass or less. The proportion of the content of each of the polystyrene-based block, the conjugated diene-based polymer block, and the conjugated diene unit in the block polymer can be calculated by an integral ratio of the $^1$H-NMR spectrum.

Specific examples of the block polymer include a styrene-butadiene block copolymer, a styrene-isoprene block copolymer, an epoxidized product of a styrene-butadiene block copolymer, and a block copolymer obtained by hydrogenating a part of a conjugated diene-based polymer block of a styrene-butadiene block copolymer or of a styrene-isoprene block copolymer. More specifically, examples thereof include a styrene-butadiene-styrene block copolymer (SBS), a styrene-isoprene-styrene block copolymer (SIS), a styrene-butadiene-butylene-styrene block copolymer (SBBS), an epoxidized product of a styrene-butadiene-styrene block copolymer, and a hydrogenation product of these copolymers. Among these, SBS or SIS having the conjugated diene-based polymer block in which a soft segment is not hydrogenated, or an epoxidized product of a styrene-butadiene-styrene block copolymer can be preferably used as the block polymer in view of easily crosslinking.

Examples of the polyethylene include low-density polyethylene (LDPE), high-density polyethylene (HDPE), and linear low-density polyethylene (LLDPE). The C5-based resin is a solid polymer (C5-based synthetic petroleum resin) obtained by polymerizing a C5 fraction using a Friedel-Crafts catalyst (AlCl$_3$, BF$_3$, or the like). Specific examples of the C5-based resin include a copolymer containing isoprene, cyclopentadiene, 1,3-pentadiene, 1-pentene, or the like as a main component, a copolymer of 2-pentene and dicyclopentadiene, and a polymer containing 1,3-pentadiene as a main component.

The C9-based resin is a solid polymer (C9-based synthetic petroleum resin) obtained by polymerizing a C9 fraction using the Friedel-Crafts catalyst (AlCl$_3$, BF$_3$, or the like). Specific examples of the C9-based resin include a copolymer containing indene, methylindene, vinyltoluene, or the like as a main component. The C5/C9-based resin is a solid polymer (C5/C9-based synthetic petroleum resin) obtained by polymerizing C5 to C9 fractions using the Friedel-Crafts catalyst (AlCl$_3$, BF$_3$, or the like). Specific examples of the C5/C9-based resin include a copolymer containing vinyltoluene, indene, or the like as a main component. The C5/C9-based resin is preferably a resin containing a small amount of C9 or more components from the viewpoint of compatibility with the rubber component. Specifically, in the C5/C9-based resin, the content of the component of C9 or more in the total amount of the resin is preferably less than 50% by mass, and more preferably 40% by mass or less.

The dicyclopentadiene-based resin is a petroleum resin using dicyclopentadiene in the C5 fraction as a main raw material. Specific examples of the dicyclopentadiene-based resin include trade name "Marukarez M" series (M-890A, M-845A, M-990A, etc.) available from Maruzen Petrochemical Co., Ltd. Examples of the alkylphenol-based resin include an alkylphenol-acetylene resin such as a p-tert-butylphenol-acetylene resin, and an alkylphenol-formaldehyde resin having a low degree of polymerization.

A blending proportion of the resin (B) is preferably 1 part by mass or more relative to 100 parts by mass of the rubber component contained in the rubber composition. Blending 1 part by mass or more of the resin (B) allows for enhancing the effect of improving the abrasion resistance, the tensile strength at break, and the crack growth resistance in the crosslinked body obtained by using the rubber composition, which is preferable. The blending proportion of the resin (B) is more preferably 3 parts by mass or more, and still more preferably 7 parts by mass or more, relative to 100 parts by mass of the rubber component. The blending proportion of the resin (B) is preferably 50 parts by mass or less, more preferably 30 parts by mass or less, still more preferably 25 parts by mass or less, relative to 100 parts by mass of the rubber component contained in the rubber composition, from the viewpoint of satisfactorily maintaining various performances of the rubber composition. One of the resins (B) may be used alone or two or more thereof may be used in combination. In the present specification, the "rubber component" contained in the rubber composition refers to a polymer which can give a cured product exhibiting rubber elasticity by thermal curing. The cured product exhibits a property of largely deforming at room temperature with a small force (for example, a deformation of stretching twice or more when stretched at room temperature) and rapidly returning to an original shape when the force is removed.

The rubber composition according to the present disclosure contains 60% to 95% by mass of the polymer (A) and 5% to 40% by mass of the resin (B), relative to the total amount of the polymer (A) and the resin (B). The blending proportion of the polymer (A) and the resin (B) within the above range allows for sufficiently obtaining the effects of improving the abrasion resistance, the tensile strength at break, and the crack growth resistance in a well-balanced manner. The blending proportion of the polymer (A) and the resin (B) is preferably 80% to 95% by mass for the polymer (A) and 5% to 20% by mass for the resin (B), and more preferably 86% to 93% by mass for the polymer (A) and 7% to 14% by mass for the resin (B) in view of a higher effect of improving the tensile strength at break and the abrasion resistance.

<Crosslinking Agent>

The crosslinked rubber according to the present embodiment is formed by heat treatment. A kind of a crosslinking agent contained in the rubber composition for the heat treatment is not limited. Specific examples of the crosslinking agent include an organic peroxide, a phenol resin, sulfur, a sulfur compound, p-quinone, a derivative of p-quinonedioxime, a bismaleimide compound, an epoxy compound, a silane compound, an amino resin, a polyol, a polyamine, a triazine compound, and a metal soap. Among these, at least one selected from the group consisting of an organic peroxide, a phenol resin, and sulfur is preferable. One of the crosslinking agents may be used alone or two or more thereof may be used in combination.

Examples of the organic peroxide include 1,3-bis(t-butylperoxyisopropyl)benzene, 2,5-dimethyl-2,5-bis(t-butylperoxy)hexyne-3, 2,5-dimethyl-2,5-bis(t-butylperoxy)hexene-3, 2,5-dimethyl-2,5-bis(t-butylperoxy)hexane, 2,2'-bis(t-butylperoxy)-p-isopropylbenzene, dicumyl peroxide, di-t-butylperoxide, and t-butylperoxide.

Examples of the phenol resin include a p-substituted phenol compound represented by the following general formula (8), an o-substituted phenol-aldehyde condensate, an m-substituted phenol-aldehyde condensate, and a brominated alkylphenol-aldehyde condensate. Among these, the p-substituted phenolic compound is preferable.

[Chem 8]

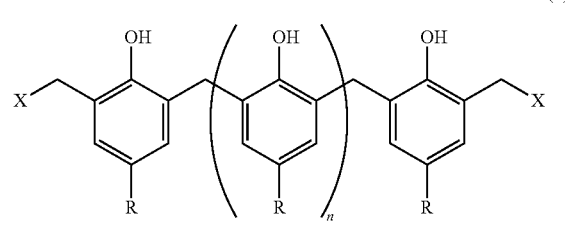

(8)

In the formula (8), X is a hydroxyl group, a halogenated alkyl group, or a halogen atom, R is a saturated hydrocarbon group having 1 to 15 carbon atoms, and n is an integer of 0 to 10. The p-substituted phenol compound can be obtained by a condensation reaction of p-substituted phenol and aldehyde (preferably formaldehyde) in the presence of an alkali catalyst.

Examples of commercially available products of the phenol resin include trade name "Tackirol 201" (alkylphenol formaldehyde resin, manufactured by Taoka Chemical Co., Ltd.), trade name "Tackirol 250-I" (brominated alkylphenol formaldehyde resin having a rate of bromination of 4%, manufactured by Taoka Chemical Co., Ltd.), trade name "Tackirol 250-III" (brominated alkylphenol formaldehyde resin, manufactured by Taoka Chemical Co., Ltd.), trade name "PR-4507" (manufactured by Gunei Chemical Co., Ltd.), trade name "ST137X" (manufactured by Rohm & Haas Co., Ltd.), trade name "SUMILITE RESIN PR-22193" (manufactured by Sumitomo Durz Co., Ltd.), trade name "TAMANOL 531" (manufactured by Arakawa Chemical Industries, Ltd.), trade name "SP1059", trade name "SP1045", trade name "SP", and trade name "SP1056" (all manufactured by Schenectady Co., Ltd.), and trade name "CRM-0803" (manufactured by Showa Union Synthetic Co., Ltd.). Among these, "Tackirol 201" is preferably used.

The amount of the crosslinking agent to be used is preferably 0.01 to 20 parts by mass, more preferably 0.1 to 15 parts by mass, and still more preferably 1 to 10 parts by mass, relative to 100 parts by mass of the total rubber component contained in the rubber composition for producing the crosslinked rubber.

When an organic peroxide is used as the crosslinking agent, the amount of the organic peroxide to be used is preferably 0.05 to 10 parts by mass, and more preferably 0.1 to 5 parts by mass, relative to 100 parts by mass of the total rubber component contained in the rubber composition for producing the crosslinked rubber. When the amount of the organic peroxide to be used is more than 10 parts by mass, a degree of crosslinking tends to be excessively high, the formability tends to reduce, and the mechanical properties of the obtained crosslinked rubber tend to reduce. On the other hand, when the amount of the organic peroxide to be used is less than 0.05 parts by mass, the degree of crosslinking is insufficient, and the rubber elasticity and mechanical strength of the obtained crosslinked rubber tend to decrease.

When a phenol resin is used as the crosslinking agent, the amount of the phenol resin to be used is preferably 0.2 to 10 parts by mass, and more preferably 0.5 to 5 parts by mass, relative to 100 parts by mass of the total rubber component contained in the rubber composition for producing the crosslinked rubber. When the amount of the phenol resin to be used is more than 10 parts by mass, the formability tends to decrease. On the other hand, when the amount of the phenol resin to be used is less than 0.2, the degree of crosslinking is insufficient, and the rubber elasticity and mechanical strength of the obtained crosslinked rubber tend to decrease.

When sulfur is used as the crosslinking agent, the amount of the sulfur to be used is preferably 0.1 to 5 parts by mass, and more preferably 0.5 to 3 parts by mass, relative to 100 parts by mass of the total rubber component contained in the rubber composition for producing the crosslinked rubber.

When at least one of a crosslinking aid and a crosslinking accelerator is used together with the crosslinking agent, the crosslinking reaction can be gently performed, and uniform crosslinking can be formed, which is preferable. When an organic peroxide is used as the crosslinking agent, it is preferable to use, as the crosslinking aid, sulfur, a sulfur compound (such as powdered sulfur, colloidal sulfur, precipitated sulfur, insoluble sulfur, surface-treated sulfur, or dipentamethylenethiuram tetrasulfide), an oxime compound (such as p-quinonoxime or p,p'-dibenzoylquinonoxime), a polyfunctional monomer (such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, trimethylolpropane tri (meth)acrylate, diallyl phthalate, tetraallyloxyethane, triallyl cyanurate, N,N'-m-phenylenebismaleimide, N,N'-toluylene bismaleimide, maleic anhydride, divinylbenzene, or zinc di(meth)acrylate). Among these, p,p'-dibenzoylquinonoxime, N,N'-m-phenylenebismaleimide, and divinylbenzene are preferable. One of these may be used alone or two or more thereof may be used in combination. N,N'-m-phenylenebismaleimide exhibits an effect as a crosslinking agent, N,N'-m-phenylenebismaleimide can be used alone as the crosslinking agent.

When an organic peroxide is used as the crosslinking agent, the amount of the crosslinking aid to be used is preferably 10 parts by mass or less, and more preferably 0.2 to 5 parts by mass, relative to 100 parts by mass of the total rubber component contained in the mixture. When the amount of the crosslinking aid to be used is more than 10 parts by mass, the degree of crosslinking tends to be excessively high, the formability tends to reduce, and the mechanical properties of the obtained crosslinked rubber tend to reduce.

When a phenol resin is used as the crosslinking agent, it is preferable to use, as the crosslinking accelerator, a metal halide (stannous chloride, ferric chloride, or the like), an organic halide (chlorinated polypropylene, bromobutyl rubber, chloroprene rubber, or the like), or the like, as a crosslinking speed can be adjusted. In addition to the crosslinking accelerator, it is more preferable to use a metal oxide such as zinc oxide or a dispersant such as stearic acid.

In the rubber composition according to the present disclosure, in addition to the polymer (A), a rubber component (hereinafter, also referred to as "another rubber component") different from the polymer (A) may be blended as a rubber component to an extent that the effect of the present disclosure is not impaired. A kind of such another rubber component is not limited, but includes butadiene rubber (BR, such as high-cis BR having 90% or more of cis-1,4-bond, syndiotactic 1,2-polybutadiene (SPB)-containing BR), styrene-butadiene rubber (SBR), natural rubber (NR), and isoprene rubber (IR), and more preferred one is at least one selected from the group consisting of NR, BR, and SBR. When another rubber component is used, the blending proportion of another rubber component is preferably 70 parts by mass or less, more preferably 50 parts by mass or less, relative to 100 parts by mass of the total amount of the rubber components (the polymer (A) and another rubber component) contained in the rubber composition.

In the rubber composition according to the present disclosure, various reinforcing fillers such as carbon black, silica, clay, and calcium carbonate can be used as a filler. Preferably, carbon black, silica, or a combination of carbon black and silica is used. Silica is preferable from the viewpoint of the static and dynamic ratio, and carbon black is preferable from the viewpoint of the strength of the rubber composition and the crosslinked rubber. Examples of the silica include wet silica (hydrous silicic acid), dry silica (anhydrous silicic acid), and colloidal silica, and wet silica is preferable. Examples of the carbon black include furnace black, acetylene black, thermal black, channel black, and graphite, and among them, furnace black is preferable.

An amount of the filler to be blended may be appropriately determined according to the purpose of use, and is, for example, 5 to 150 parts by mass, relative to 100 parts by mass of the rubber component blended in the rubber composition. The total amount of the silica and the carbon black in the rubber composition is preferably 20 to 130 parts by mass, and more preferably 25 to 110 parts by mass, relative to 100 parts by mass of the total amount of the rubber component contained in the rubber composition.

Into the rubber composition according to the present disclosure, in addition to the components described above, various additives to be commonly used in the rubber composition for giving a crosslinked rubber for various applications such as a tire, a hose, vibration isolation and a belt may be blended. Examples of the additive include an antioxidant, zinc oxide, stearic acid, a softening agent, sulfur, and a vulcanization accelerator. The blending proportion thereof can be appropriately selected according to the kind of the additive as long as the effect of the present disclosure is not impaired.

<<Crosslinked Body and Tire>>
<Crosslinking Step>

When the rubber composition according to the present disclosure is used as a rubber article, the rubber composition is usually formed into a given shape and then subjected to a crosslinking treatment. The rubber article can be produced according to usual methods. For example, in production of tires, the rubber composition is mixed in a mixing machine such as a roll or a mixer, formed into a given shape, and the shaped one is disposed outside and formed by vulcanization according to a usual method to thereby form one or both of a tread and a sidewall, and thus a pneumatic tire is obtained. For obtaining the rubber article, the above-mentioned crosslinking agent and the above-mentioned crosslinking aid can be used as the crosslinking agent and the crosslinking aid.

The crosslinked rubber based on the above exhibits high strength and excellent abrasion resistance, and is excellent in crack growth resistance, and thus can be applied to various rubber articles. Specifically, the crosslinked rubber can be used as materials for treads or sidewalls of a tire; anti-vibration rubbers for industrial machines and facilities; various hoses such as diaphragms, rolls, radiator hoses and air hoses, and hose covers; sealing materials such as packings, gaskets, weather strippings, O-rings, and oil seals; belts such as power transmission belts; linings and dust boots. Among these, the crosslinked rubber can be suitably used as members for tires, members for anti-vibrations, and members for belts, and can be particularly suitably used as members for tires.

EXAMPLE

The following will specifically describe the present disclosure based on Examples but the contents of the present disclosure are not limited to these Examples. "part(s)" and "%" in Examples and Comparative Examples are on the basis of mass, unless otherwise specified. The following will show methods for measuring values of various physical properties.

[Bound styrene content (%)]: it was measured by 500 MHz $^1$H-NMR.

[1,2-vinyl content (%)]: it was measured by 500 MHz $^1$H-NMR.

[Molecular weight before modification]: it was determined, in terms of polystyrene, from the retention time corresponding to the vertex of a maximum peak on the gel permeation chromatography (GPC) curve obtained using gel permeation chromatography (GPC) (HLC-8120GPC (trade name (manufactured by Tosoh Corporation)).

(GPC Conditions)

Column: trade name "GMHXL" (manufactured by Tosoh Corporation), two columns

Column temperature: 40° C.

Mobile phase: tetrahydrofuran

Flow rate: 1.0 ml/min

Sample concentration: 10 mg/20 ml

[Mooney viscosity]: it was determined in accordance with JIS K6300-1: 2013 and using an L rotor under conditions of a preheating time of 1 minute, a rotor operation time of 4 minutes, and a temperature of 100° C.

[Rate of hydrogenation (%)] and [α]: it was determined by 500 MHz $^1$H-NMR.

<Production of Highly Saturated Diene-Based Polymer>
<Production of Hydrogenation Catalyst>

Production Example 1: Synthesis of Catalyst A

A three-necked flask of a volume of 1 L equipped with a stirrer and a dropping funnel was purged with dry nitrogen, and 200 ml of anhydrous tetrahydrofuran and 0.2 mol of tetrahydrofurfuryl alcohol were added thereto. Thereafter, an n-butyllithium/cyclohexane solution (0.2 mol) was added dropwise to the three-necked flask at 15° C. to perform a reaction, and a tetrahydrofuran solution of tetrahydrofurfuryloxylithium was obtained.

Next, the three-necked flask of a volume of 1 L equipped with a stirrer and a dropping funnel was purged with dry nitrogen, and 49.8 g (0.2 mol) of bis (15-cyclopentadienyl) titanium dichloride and 250 ml of anhydrous tetrahydrofuran were added thereto. Then, while stirring the solution at room temperature, the tetrahydrofuran solution of tetrafuryloxylithium obtained by the method described above was added dropwise over about 1 hour. After about 2 hours, a reddish brown liquid was filtered, and an insoluble portion was washed with dichloromethane.

Thereafter, the filtrate and the washing liquid are combined and the solvent is removed under reduced pressure, and the catalyst A [bis(η5-cyclopentadienyl)titanium(tetrahydrofurfuryloxy)chloride] (also referred to as "[chlorobis (2,4-cyclopentadienyl)titanium(IV)tetrahydrofurfuryl alkoxide]") was obtained. The yield was 95%.

<Production of Hydrogenated Conjugated Diene-Based Polymer>

Production Example 2: Synthesis of Hydrogenated Conjugated Diene-Based Rubber A

Into an autoclave reactor of an internal volume of 10 liters purged with nitrogen were charged 5000 g of cyclohexane, 150.0 g of tetrahydrofuran, 250 g of styrene, and 730 g of 1,3-butadiene. After the temperature of the contents of the reactor was controlled to 10° C., a cyclohexane solution containing n-butyllithium (11.60 mmol) was added thereto to initiate polymerization. The polymerization was performed under adiabatic conditions, and the maximum temperature reached 85° C.

At the time when the polymerization conversion reached 99%, 20 g of butadiene was additionally added and polymerization was further performed for 5 minute to obtain a reaction solution containing a polymer. To the resulting reaction solution, 8.5 g of N,N-bis(trimethylsilyl)aminopropylmethyldiethoxysilane was added, followed by reaction for 30 minutes.

Next, 0.32 g of the catalyst A and 0.39 g of tetrachlorosilane were added, followed by reaction for 55 minutes while maintaining a hydrogen pressure of 1.0 MPa. After the reaction, the temperature and pressure of the reaction solution was returned to normal and the reaction solution was taken out of the reaction vessel to obtain a polymer solution.

Next, an aqueous solution (temperature: 80° C.) adjusted to pH 8.5 (pH at 80° C. by a glass electrode method, hereinafter, the same applies hereinafter) with ammonia as a pH adjusting agent was placed in a desolvation tank, and the polymer solution was further added (at a ratio of 200 parts by mass of the aqueous solution to 100 parts by mass of the polymer solution), and the mixture was dissolved by steam stripping (steam temperature: 190° C.) for 2 hours at a liquid phase temperature of 95° C. in the desolvation tank, and was dried with a hot roll whose temperature was controlled to 110° C. to obtain a hydrogenated conjugated diene-based rubber A. The properties of the resulting hydrogenated conjugated diene-based rubber A are shown in Table 1 below.

<Production of Conjugated Diene-Based Polymer>

Production Example 3: Synthesis of Conjugated Diene-Based Rubber S

Into an autoclave reactor of an internal volume of 5 liters purged with nitrogen was charged 2750 g of cyclohexane, 50.0 g of tetrahydrofuran, 125 g of styrene, and 365 g of 1,3-butadiene. After the temperature of the contents of the reactor was controlled to 10° C., a cyclohexane solution containing n-butyllithium (5.80 mmol) was added thereto to initiate polymerization. The polymerization was performed under adiabatic conditions, and the maximum temperature reached 85° C.

At the time when the polymerization conversion reached 99%, 10 g of butadiene was additionally added and polymerization was further performed for 5 minute to obtain a reaction solution containing a polymer. To the resulting reaction solution, 4.25 g of N,N-bis(trimethylsilyl)aminopropylmethyldiethoxysilane was added, followed by reaction for 30 minutes. To the resulting polymer solution, 2.0 g of 2,6-di-tert-butyl-p-cresol was added. Subsequently, the polymer solution was dissolved by steam stripping using hot water whose pH was adjusted to 9 with sodium hydroxide, and was dried with a hot roll whose temperature was controlled to 110° C. to obtain a conjugated diene-based polymer S. The properties of the resulting conjugated diene-based rubber S are shown in Table 1 below.

TABLE 1

|  | Production Example 2 | Production Example 3 |
| --- | --- | --- |
| Kind of (hydrogenated) conjugated diene-based rubber | A | S |
| Bound styrene content (% by mass) | 25 | 25 |
| 1,2-vinyl content (% by mass) | 58 | 56 |
| Weight-average molecular weight (×10$^4$) | 19 | 20 |
| Mooney viscosity (ML1 + 4, 100° C.) | 65 | 63 |
| Rate of hydrogenation | 91 | 0 |
| α | 0.91 | 0 |

<Production and Characteristics Evaluation of Rubber Composition>

Examples 1 to 11 and Comparative Examples 1 to 3

In the first kneading, the hydrogenated conjugated diene-based rubber A, the hydrogenated conjugated diene-based polymer S, a natural rubber, a thermoplastic resin, silica, carbon black, a silane coupling agent, stearic acid, an antioxidant, and zinc oxide were blended and kneaded according to the formulation shown in Table 2 using a plastomill (internal volume: 250 cc) equipped with a temperature controller, at a filling rate of 72% and a rotational speed of 60 rpm. Then, in the second kneading, after cooling the above-obtained blend to room temperature, sulfur and the vulcanization accelerator were blended into the blend, followed by kneading. The resulting blend was then shaped, and vulcanized at 160° C. for a given time by vulcanizing press. Using the rubber composition before vulcanization or vulcanized rubber, the following characteristics (1) to (3) were evaluated.

(1) Tensile strength at break: In accordance with JIS K6251:2010, a No. 3 dumbbell-shaped test piece formed of a vulcanized rubber sheet for test was produced as a test piece for evaluation. With a tensile tester (model name "AG-2000", manufactured by Shimadzu Corporation), the sample piece was pulled at a load speed of 500 mm/min to determine a tensile strength at break (TB). The tensile strength at break is indicated by an index when the value of Comparative Example 1 is set as 100, and the larger numerical value equates the higher strength.

(2) Abrasion resistance: A vulcanized rubber was used as a measurement sample. With a DIN abrasion tester (manufactured by Toyo Seiki Seisaku-sho, Ltd.), the abrasion resistance was measured in accordance with JIS K6264-2: 2005 at 25° C. with a load of ION. The abrasion resistance is indicated as an index when the value of Comparative Example 1 is set as 100, and the larger numerical value equates to the better abrasion resistance.

(3) Crack growth resistance: The rubber composition was formed into a sheet shape by calendaring, and then vulcanized at 160° C. for a given time using a vulcanization press machine to prepare a sheet formed of a crosslinked rubber having a thickness of 2 mm. The resulting sheet was subjected to punching to prepare a test piece having an IV-type dumbbell shape described in ASTM D638. At this time, the sheet was punched such that a longitudinal direction of the dumbbell shape was a grain direction of the sheet, and a crack extending in an opposite grain direction was formed at a center position in the longitudinal direction of the dumbbell shape. The resulting test piece was subjected to a fatigue test by constant extension under the conditions of an extension rate of 100%, a measurement temperature of 23° C., and a rotational speed of 300 cpm, and the number of cycles until the test piece was broken was measured. The crack growth resistance is indicated as an index when the value of Comparative Example 1 is set as 100, and the larger numerical value equates to the better crack growth resistance.

The evaluation results of the characteristics of Examples 1 to 11 and Comparative Examples 1 to 3 are shown in Table 2 below.

TABLE 2

| | Example 1 | Example 2 | Example 3 | Example 4 | Comparative Example 1 | Example 5 | Comparative Example 2 |
|---|---|---|---|---|---|---|---|
| [Blending formulation (phr)] | | | | | | | |
| Rubber component: | | | | | | | |
| Hydrogenated SBR | 60 | 60 | 60 | 60 | 60 | 80 | 80 |
| SBR | 20 | 20 | 20 | 20 | 20 | 20 | 20 |
| NR | 20 | 20 | 20 | 20 | 20 | — | — |
| Resin component: | | | | | | | |
| SIS | 10 | — | — | — | — | 10 | — |
| SIBS | — | 10 | — | — | — | — | — |
| Epoxy SBS | — | — | 10 | — | — | — | — |
| Polyethylene | — | — | — | 10 | — | — | — |
| AS resin | — | — | — | — | — | — | — |
| C5/C9-based resin | — | — | — | — | — | — | — |
| Other component: | | | | | | | |
| Silica | 45 | 45 | 45 | 45 | 45 | 45 | 45 |
| Carbon black | 5 | 5 | 5 | 5 | 5 | 5 | 5 |
| Silane coupling agent | 3.6 | 3.6 | 3.6 | 3.6 | 3.6 | 3.6 | 3.6 |
| Stearic acid | 2 | 2 | 2 | 2 | 2 | 2 | 2 |
| Antioxidant | 1 | 1 | 1 | 1 | 1 | 1 | 1 |
| Zinc oxide | 3 | 3 | 3 | 3 | 3 | 3 | 3 |
| Vulcanization accelerator CZ | 1.8 | 1.8 | 1.8 | 1.8 | 1.8 | 1.8 | 1.8 |
| Vulcanization accelerator D | 1.5 | 1.5 | 1.5 | 1.5 | 1.5 | 1.5 | 1.5 |
| Sulfur | 1.5 | 1.5 | 1.5 | 1.5 | 1.5 | 1.5 | 1.5 |
| [Physical properties of rubber composition] | | | | | | | |
| Tensile strength at break | 109 | 109 | 111 | 107 | 100 | 106 | 98 |
| Abrasion resistance | 112 | 114 | 115 | 111 | 100 | 115 | 103 |
| Crack growth resistance | 114 | 111 | 109 | 111 | 100 | 108 | 98 |

| | Example 6 | Example 7 | Example 8 | Example 9 | Example 10 | Example 11 | Comparative Example 3 |
|---|---|---|---|---|---|---|---|
| [Blending formulation (phr)] | | | | | | | |
| Rubber component: | | | | | | | |
| Hydrogenated SBR | 100 | 100 | 100 | 100 | 100 | 100 | 100 |
| SBR | — | — | — | — | — | — | — |
| NR | — | — | — | — | — | — | — |
| Resin component: | | | | | | | |
| SIS | 10 | — | — | — | — | — | — |
| SIBS | — | 10 | — | — | — | — | — |
| Epoxy SBS | — | — | 10 | — | — | — | — |
| Polyethylene | — | — | — | 10 | — | — | — |
| AS resin | — | — | — | — | 10 | — | — |
| C5/C9-based resin | — | — | — | — | — | 10 | — |
| Other component: | | | | | | | |
| Silica | 45 | 45 | 45 | 45 | 45 | 45 | 45 |
| Carbon black | 5 | 5 | 5 | 5 | 5 | 5 | 5 |
| Silane coupling agent | 3.6 | 3.6 | 3.6 | 3.6 | 3.6 | 3.6 | 3.6 |
| Stearic acid | 2 | 2 | 2 | 2 | 2 | 2 | 2 |
| Antioxidant | 1 | 1 | 1 | 1 | 1 | 1 | 1 |
| Zinc oxide | 3 | 3 | 3 | 3 | 3 | 3 | 3 |
| Vulcanization accelerator CZ | 1.8 | 1.8 | 1.8 | 1.8 | 1.8 | 1.8 | 1.8 |
| Vulcanization accelerator D | 1.5 | 1.5 | 1.5 | 1.5 | 1.5 | 1.5 | 1.5 |
| Sulfur | 1.5 | 1.5 | 1.5 | 1.5 | 1.5 | 1.5 | 1.5 |
| [Physical properties of rubber composition] | | | | | | | |
| Tensile strength at break | 112 | 114 | 113 | 114 | 115 | 111 | 104 |
| Abrasion resistance | 124 | 122 | 120 | 121 | 121 | 118 | 112 |
| Crack growth resistance | 112 | 110 | 109 | 106 | 109 | 109 | 95 |

In Table 2, the details of each component used are as follows.

Hydrogenated SBR: hydrogenated conjugated diene-based rubber A

SBR: conjugated diene-based rubber S

SIS: JSRSIS5250 (styrene content: 20%) manufactured by JSR Corporation

SIBS: SIBSTAR 102T (styrene content: 23%) manufactured by Kaneka Corporation

Epoxy SBS: EPOFRTEND A102 (styrene content 40%) manufactured by Daicel Chemical Industries, Ltd.

Polyethylene: KS340T manufactured by Japan Polyethylene Corporation

AS resin: SANREX SAN-C(styrene content: 73%) manufactured by Techno UMG Co., Ltd.

C5/C9-based resin: T-REZ PR802 manufactured by JXTG Energy Corporation

Carbon black: Diablack N339 manufactured by Mitsubishi Chemical Corporation

Silica: Nipsil AQ manufactured by Tosoh Silica Corporation

Silane coupling agent: Si69 manufactured by Evonik

Antioxidant: Nocrac 810NA manufactured by Ouchi Shinko Chemical Industrial Co., Ltd.

Vulcanization accelerator CZ: Nocceler CZ manufactured by Ouchi Shinko Chemical Industrial Co., Ltd.

Vulcanization accelerator D: Nocceler D manufactured by Ouchi Shinko Chemical Industrial Co., Ltd.

In Table 2, "-" indicates that the compound in the corresponding column was not used.

As is clear from Table 2, in the rubber composition containing the highly saturated diene-based polymer and the thermoplastic resin at a given ratio (Examples 1 to 11), tensile strength, abrasion resistance, and crack growth resistance were improved in a well-balanced manner as compared with the rubber composition containing no thermoplastic resin (Comparative Examples 1 to 3).

The invention claimed is:

1. A rubber composition, comprising:
(A) a polymer which has a carbon-carbon unsaturated bond, and in which a value a represented by the following equation (i) is 0.70 or more and 0.99 or less when p, q, r, and s are defined as constituent molar proportions, in the polymer, of a structural unit represented by the following formula (1), a structural unit represented by the following formula (2), a structural unit represented by the following formula (3), and a structural unit represented by the following formula (4), respectively; and
(B) a thermoplastic resin,
wherein the polymer (A) is contained in an amount of 60% to 95% by mass and the resin (B) is contained in an amount of 5% to 40% by mass relative to a total amount of the polymer (A) and the resin (B), the resin (B) is a styrene-based resin and the styrene-based resin is a block polymer having a conjugated diene-based polymer block and a polystyrene-based block, $$\alpha=(p+(0.5\times r))/(p+q+(0.5\times r)+s) \quad (i)$$

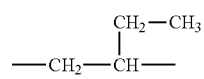
(1)

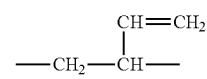
(2)

(3)

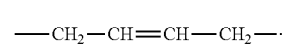
(4)

2. The rubber composition according to claim 1, wherein the polymer (A) has one or more functional groups selected from the group consisting of an amino group, a nitrogen-containing heterocyclic group, a phosphino group, a hydroxyl group, a thiol group, and a hydrocarbyloxysilyl group.

3. The rubber composition according to claim 1, wherein the polymer (A) has a partial structure derived from at least one selected from the group consisting of a compound represented by the following formula (9), a compound represented by the following formula (10), a compound represented by the following formula (11), and a compound represented by the following formula (12)

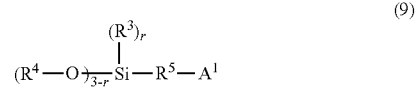
(9)

where $A^1$ is a monovalent functional group having at least one atom selected from the group consisting of nitrogen, phosphorus, oxygen, sulfur and silicon and bonding to $R^5$ with a nitrogen atom, a phosphorus atom, an oxygen atom, a sulfur atom, a silicon atom or a carbon atom contained in a carbonyl group, or a (thio)epoxy group; $R^3$ and $R^4$ are hydrocarbyl groups, $R^5$ is a hydrocarbylene group, and r is an integer of 0 to 2; provided that when there is more than one $R^3$, $R^3$s are the same group or different groups from each other; and provided that when there is more than one $R^4$, $R^4$s are the same group or different groups from each other;

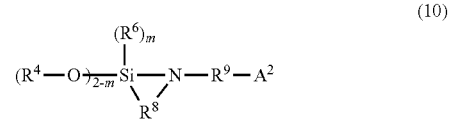
(10)

where $A^2$ is a monovalent functional group having at least one atom selected from the group consisting of nitrogen, phosphorus, oxygen, sulfur and silicon, having no active hydrogen, and bonding to $R^9$ with a nitrogen atom, a phosphorus atom, an oxygen atom, a sulfur atom or a silicon atom, or a hydrocarbyl group having 1 to 20 carbon atoms; $R^6$ and $R^7$ are each independently a hydrocarbyl group; $R^8$ is a hydrocarbylene group; $R^9$ is a single bond or a hydrocarbylene group, and m is 0 or 1; and provided that when there is more than one $R^7$, $R^7$s are the same group or different groups from each other;

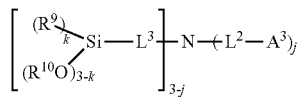
(11)

where $A^3$ is a monovalent group bonding to $L^2$ with an imino group, an amide group, a (thio)carbonyl group, a (thio)carbonyloxy group, a sulfide group or a polysulfide group, or is a protected primary amino group, a protected secondary amino group, a tertiary amino group, a nitrile group, a pyridyl group, a (thio)epoxy group, a (thio)isocyanate group, a (thio)formyl group, a (thio)carboxylic acid ester group, a metal salt of a (thio)carboxylic acid ester group, —$COX^1$ (in which $X^1$ is a halogen atom, an imidazolyl group or a group represented by the following formula (11a); $L^2$ and $L^3$ are each independently a single bond or a hydrocarbylene group having 1 to 20 carbon atoms, and $R^9$ and $R^{10}$ are each independently a hydrocarbyl group, K is an integer of 0 to 2, and j is 0 or 1; and when the formula includes more than one of the same symbols for each symbol of $R^9$, $R^{10}$ and $L^3$, the groups represented by the symbols are the same group or different groups from each other; when there is more than one k in the formula, and k's are the same number or different numbers;

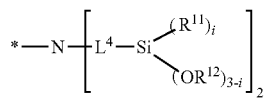
(11a)

where $L^4$ is a single bond or a hydrocarbylene group having 1 to 20 carbon atoms, and $R^{11}$ and $R^{12}$ are each independently a hydrocarbyl group, and i is an integer of 0 to 3; "*" represents a site that bonds to $L^2$; for each symbol of $R^{11}$, $R^{12}$, and $L^4$, the groups represented by the symbols are the same group or different groups from each other; and more than one i in the formula is the same number or different numbers; and

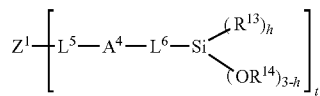
(12)

where $A^4$ is an imino group, an amide group, a (thio)carbonyl group, or a (thio)carbonyloxy group; $Z^1$ is a t-valent group having 1 to 20 carbon atoms and having a nitrogen atom or having no nitrogen atom; $L^5$ is a single bond or a hydrocarbylene group having 1 to 20 carbon atoms; $L^6$ is a hydrocarbylene group having 1 to 20 carbon atoms; and $R^{13}$ and $R^{14}$ are each independently a hydrocarbyl group, h is 0 or 1 and t is 2 or 3; for each symbol of $R^{14}$, $L^5$, $L^6$, and $A^4$, the groups represented by the symbols are the same group or different groups from each other; and more than one h in the formula is the same number or different numbers.

4. The rubber composition according to claim 1, further comprising: a crosslinking agent.

5. A crosslinked body, which is obtained by using the rubber composition according to claim 1.

6. A tire in which one or both of a tread and a sidewall are formed by the crosslinked body according to claim 5.

* * * * *